& # x20;

United States Patent [19]

Pohto et al.

[11] Patent Number: 5,514,441
[45] Date of Patent: May 7, 1996

[54] RETROREFLECTIVE SHEETING WITH IMPROVED TOPCOAT

[75] Inventors: Susan L. Pohto, Painesville; Richard J. Katona, Mentor; George H. Wise, Fairport; Robert K. Rega, Mentor, all of Ohio

[73] Assignee: Avery Dennison Corporation, Pasadena, Calif.

[21] Appl. No.: 315,608

[22] Filed: Sep. 30, 1994

[51] Int. Cl.$^6$ ..................................... G02B 5/12
[52] U.S. Cl. .............. 428/72; 359/536; 359/538; 359/541; 428/76; 428/323; 428/325; 428/327; 428/402; 428/425.8; 428/425.9
[58] Field of Search .................. 428/40, 72, 76, 428/402, 425.8, 425.9, 325, 323, 327; 359/536, 538, 541

[56] References Cited

U.S. PATENT DOCUMENTS

| | | | |
|---|---|---|---|
| 4,451,597 | 5/1984 | Victorius | 524/39 |
| 4,648,932 | 3/1987 | Bailey | 156/276 |
| 4,664,966 | 5/1987 | Bailey | 428/203 |
| 4,725,494 | 2/1988 | Belisee | 428/325 |
| 4,725,495 | 2/1988 | Belisle | 428/325 |
| 4,755,425 | 7/1988 | Huang | 428/331 |
| 4,767,659 | 8/1988 | Bailey | 428/203 |
| 4,808,471 | 2/1989 | Grungnger | 428/325 |
| 4,844,976 | 7/1989 | Huang | 428/323 |
| 4,950,525 | 8/1990 | Bailey | 428/164 |
| 5,008,142 | 4/1991 | Wilson | 428/203 |
| 5,055,347 | 10/1991 | Bacon | 428/250 |
| 5,073,404 | 12/1991 | Huang | 427/39 |
| 5,085,918 | 2/1992 | Rajon | 428/195 |
| 5,117,304 | 5/1992 | Huang | 359/529 |
| 5,378,520 | 1/1995 | Nagaoka | 428/72 |

FOREIGN PATENT DOCUMENTS 0223564 5/1987 European Pat. Off. .

*Primary Examiner*—Nasser Ahmad
*Attorney, Agent, or Firm*—Renner, Otto, Boisselle & Sklar

[57] ABSTRACT

Retroreflective sheeting having an aliphatic polyurethane topcoat is described. The aliphatic polyurethane topcoat is obtainable from a mixture comprising (A) an aliphatic polyurethane derived from an aliphatic polyisocyanate and a polyester polyol prepared from a mixture comprising (A-1) a dicarboxylic acid component comprising isophthalic acid as the major dicarboxylic acid; and (A-2) a polyol component; and (B) cellulose acetate butyrate. The mixture also may contain (C) at least one non-reactive solvent, and optionally, (D) one or more surfactants including, for example, hydroxy-containing non-silicone surfactants.

32 Claims, 1 Drawing Sheet

RETROREFLECTIVE SHEETING WITH IMPROVED TOPCOAT

FIELD OF THE INVENTION

The present invention relates to retroreflective sheeting. More particularly, the invention relates to embedded or enclosed lens retroreflective sheeting.

BACKGROUND OF THE INVENTION

There are several types of retroreflective sheeting including exposed lens, embedded lens and encapsulated lens retroreflective sheeting. In general, retroreflective sheeting comprises a multiplicity of lens elements and a reflector located behind the lens elements. A lens elements may be, for example, glass or ceramic microspheres in a polymeric base sheet. The reflector may be a layer of reflective metal such as aluminum which has been vapor-deposited on the lens elements or at some other location behind the lens elements, flakes of reflective metal embedded in a binder layer, etc.

Exposed lens retroreflective sheeting generally comprises a polymeric binder fdm in which a multiplicity of lens elements such as glass microspheres are partially embedded, and a reflecting means is disposed on the backside of the embedded lens elements. Embedded or enclosed lens retroreflective sheeting generally comprises glass or ceramic beads completely embedded in a polymer binder film or multiplicity of films. A mirror or reflective surface, generally formed from a metallic vapor coat is formed on the backside of the polymer/bead composite. In a typical operation, light passes through the beads which individually act as lenses focusing the light and directing the light against the mirrored surface. The light is then reflected back through the beads and toward the source. Typically, the mirror surface is separated from the glass beads by a spacing layer or "spacecoat" which provides the desired focal length between the beads and the reflective surface. Thus, the elements of a typical enclosed or embedded lens retroreflective sheeting are: lens arrangement (beads embedded in polymer), spacing layer (space coat), and reflector surface (vapor coat). The sheeting may include other elements such as a transparent covering layer conforming to the front extremities of the lens elements and having a flat front face, and an optional transparent top layer for improving weatherability.

Retroreflective sheeting has many applications. For example, enclosed lens retroreflective sheeting may be applied to a substrate such as wood, plastic or metal, and used to form highway signs, license plates, safety signs and reflectors. In many of these applications, depending upon the application of the retroreflective sheet, the sheeting should be characterized by one or more of the following properties: reflectivity, embossability, printability, flexibility, etc.

A number of polymer resins have been suggested as useful in forming the transparent cover film and protective topcoat on retroreflective sheeting. When the retroreflective sheeting is to be formed such as by embossing, the protective topcoat is generally a thermoplastic resin. Plasticized polyvinyl chloride resins, for example, have been used as transparent topcoats. U.S. Pat. Nos. 4,767,659 and 4,664,966 describe thermoplastic polymer topcoats selected from (a) one or more aliphatic urethanes, (b) one or more copolymers of monomers comprising by weight a major proportion of at least one of ethylene and propylene and a minor proportion of another monomer, and (c) homopolymers of ethylene or propylene. A preferred aliphatic urethane described in this patent is prepared from an aliphatic polyfunctional isocyanate and a polyfunctional hydroxyl-containing polymer. U.S. Pat. Nos. 4,505,967 and 4,950,525 describe elastomeric retroreflective sheeting wherein the cover layer may comprise a thermoplastic elastomeric aliphatic polyurethane. U.S. Pat. No. 4,808,471 describes a flat transparent topcoat for retroreflective sheeting which is as tough and as resistant to solvent and abrasion as alkyd resins and is weather-resistant like acrylic polyesters. The topcoat described in this patent is made from a mixture of a hydroxy-functional acrylic polyol and a curing agent which is an aliphatic polyfunctional isocyanate.

In U.S. Pat. Nos. 4,755,425, 4,844,976 and 5,073,404, the patentee describes retroreflective sheeting which is coated with a mixture of silica in a transparent polymer selected from the group consisting of aliphatic polyurethanes and polyvinyl chloride copolymers having a minor mount of a comonomer containing at least one carboxylic acid or hydroxyl moiety. The silica comprises from 10 to 80 weight percent of the transparent protective coating. The silica-containing coating is described as providing superior soil and dew-repellency and is reported to retain a higher percentage of original brightness after exposure to dirt and/or dew conditions.

U.S. Pat. No. 5,117,304 describes flexible retroreflective articles based upon an optically dear aliphatic polyurethane polymer containing a plurality of hard chain segments. These polyurethanes are used in the formation of the retroreflective elements of the article.

SUMMARY OF THE INVENTION

Retroreflective sheeting having an aliphatic polyurethane topcoat is described. The aliphatic polyurethane topcoat is obtainable from a film-forming mixture comprising (A) an aliphatic polyurethane derived from an aliphatic polyisocyanate and a polyester polyol prepared from a mixture comprising (A-1) a dicarboxylic acid component comprising isophthalic add as the major dicarboxylic acid; and (A-2) a polyol component; and (B) cellulose acetate butyrate. The film-forming mixture also may contain (C) at least one non-reactive solvent, and optionally, (D) one or more surfactants including, for example, hydroxy-containing non-silicone surfactants.

DESCRIPTION OF THE PREFERRED EMBODIMENTS

Figure 1:
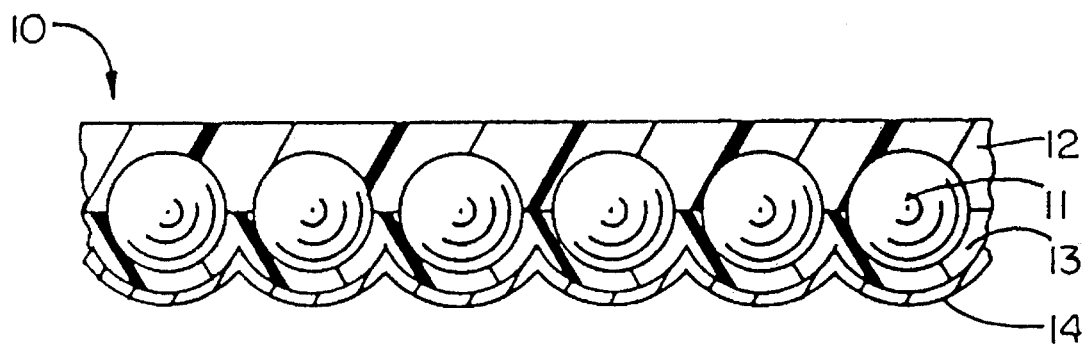
FIG. 1 is an enlarged schematic cross-section through an enclosed lens retroreflective sheeting of the invention.

The retroreflective sheeting of the present invention contains an aliphatic polyurethane topcoat obtainable from the film-forming mixture comprising (A) an aliphatic polyurethane derived from an aliphatic polyisocyanate and a polyester polyol as described more fully below, and (B) cellulose acetate butyrate. The topcoat is a transparent protective coating which generally is printable. The retroreflective sheet itself comprises several layers, and the term "topcoat" will be used herein to designate the first film in an enclosed lens reflective sheeting which is a transparent layer overlying and conforming to the top extremities or surfaces of the lens elements and has a flat top face or surface. The term "spacing layer" or "spacecoat" is used herein to generally refer to the resin layer which underlies and contacts the bottom surfaces of the lenses, and has a back surface or bottom face that is spaced from the bottom surface of the lenses which bears the reflective coat or reflective surface.

The novel retroreflective sheeting of the present invention differs from those of the prior art by virtue of the presence of the particular aliphatic polyurethane topcoat layer described and claimed herein. The aliphatic polyurethanes which are included in the film-forming mixtures used to form the aliphatic polyurethane topcoat are derived from an aliphatic polyisocyanate and a specified type of polyester polyol. The aliphatic polyisocyanates which may be utilized to derive the aliphatic polyurethane topcoats may be any of the known aliphatic polyisocyanates used to form urethane resins and are preferably aliphatic polyisocyanates without any aromatic polyisocyanate.

The aliphatic polyisocyanates useful in preparing the aliphatic polyurethanes used in the present invention may generally correspond to the formula $$Q(NCO)_x \qquad (I)$$

in which x is at least 2 and Q represents a di-, tri-, or tetravalent-aliphatic hydrocarbon group containing from 2 to 100 carbon atoms and 0 to 50 heteroatoms or a cycloaliphatic hydrocarbon group containing from 4 to 100 carbon atoms and 0 to 50 heteroatoms. The heteroatoms that can be present in Q include non-peroxidic oxygen, sulfur, non-amino nitrogen, halogen, silicon and phosphorus.

Examples of polyisocyanates represented by Formula I include ethylene diisocyanate, 1,4-tetramethylene diisocyanate, 1,6-hexamethylene diisocyanate (HDI), 1,12-dodecane diisocyanate, cyclobutane, 1,3-diisocyanate, 1-isocyanato-3,3,5 -trimethyl-5-isocyanato methyl cyclohexane, bis(4-isocyanato cyclohexyl)methane, isophorone diisocyanate (IPDI), bis(4-isocyanatocyclohexo)methane; 4,4'-methylenedicyclohexyl diisocyanate; 1,6-diisocyanato-2,2,4,4-tetramethylhexane; 1,6 -diisocyanato-2,4,4-trimethylhexane; cyclohexane-1,4-diisocyanate; etc. Desmodur H® from Miles Inc. is described as HDI having an NCO content of 50%, and Desmodur W from Miles Inc. is described as bis(4-isocyanato-cyclohexyl)methane containing 32% of NCO.

Higher molecular weight aliphatic polyisocyanates also are useful and are often preferred because the diisocyanates are toxic and raise industrial hygiene concerns. Examples of polyisocyanates include adducts, prepolymers and isocyanate trimers. For example, the trimethylol propane adducts of the various monomeric isocyanates such as HDI and isophorone diisocyanate (IPDI) are useful. Biurets of the diisocyanates also are useful and are commercially available. For example, the biuret of HDI is available as Desmodur N from Miles Inc. Desmodur N-75 and Desmodur N-100 are examples of commercially available biuret of HDI, and Desmodur Z-4370 is a biuret of IPDI. Both of these materials are available from miles Inc.

Aliphatic diisocyanates also can be converted to trimers that contain an isocyanurate ring. Trimers of HDI are available commercially from Miles under the trademarks Desmodur N-3300 and Desmodur N-3390.

The polyester polyols useful in preparing the aliphatic polyurethanes (A) are prepared from a mixture comprising (A-1) a dicarboxylic acid component comprising isophthalic acid as the major dicarboxylic acid in the component, and (A-2) a polyol component.

The mixture used to form the polyester polyol generally will comprise from about 40 to about 60 mole percent of the dicarboxylic acid component (A-1) and from about 40 to about 60 mole percent of the polyol component (A-2). In one preferred embodiment, the mixture comprises from about 42 to about 55 mole percent of the dicarboxylic acid component and from about 45 to about 58 mole percent of the polyol component.

The dicarboxylic acid component contains a mixture of dicarboxylic acids in which the isophthalic acid is the major dicarboxylic acid present. Generally, the mixture will contain (i) from about 40 to about 80 mole percent of isophthalic acid, (ii) from about 20 to about 50 mole percent of at least one dicarboxylic acid of the formula $$HOOC(CH_2)_n COOH \qquad (II)$$

wherein n is an integer from 2 to about 8, and (iii) from about 0 to about 20 mole percent of at least one other dicarboxylic acid or dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

In another embodiment, the dicarboxylic acid component comprises (i) from about 40 to about 60 mole percent of isophthalic acid, (ii) from about 30 to about 50 mole percent of at least one dicarboxylic acid of Formula II, and (iii) from 0 to about 10 mole percent of at least one other dicarboxylic acid or dicarboxylic acid anhydride as specified above.

Examples of dicarboxylic acid mixtures particularly useful in the present invention include: a mixture of isophthalic acid and adipic acid; a mixture of isophthalic acid, adipic acid, and phthalic acid or phthalic acid anhydride; a mixture of isophthalic acid, azelaic acid and terephthalic acid; a mixture of isophthalic acid, succinic acid and hexahydrophthalic acid anhydride; a mixture of isophthalic acid and sebacic acid; a mixture of isophthalic acid, adipic acid and tetrahydrophthalic acid anhydride; etc.

The polyol component of the mixture used to form the polyester polyols generally contains (iv) from about 70 to about 90 mole percent of 1,6-hexanediol and (v) from about 10 to about 30 mole percent of at least one higher hydric polyol. Generally the higher hydric polyol is selected from the group consisting of trimethylolpropane, glycerol, pentaerythritol, and mixtures thereof. Specific examples of the polyol component mixtures include mixtures of: 1,6-hexanediol and glycerol; 1,6-hexanediol and pentaerythritol; 1,6-hexanediol and trimethylolpropane; 1,6-hexanediol, trimethylolpropane and glycerol; etc.

The preparation of the polyester polyols from the dicarboxylic acid component (A-1) and the polyol component (A-2) described above can be carried out in a known manner by methods described in the prior art. The esterification is optionally carried out in the presence of a catalytic quantity of a conventional esterification catalyst such as acids, bases, or transition metal compounds such as titanium tetrabutylate at temperatures of from about 80° C. to about 260° C., more often from about 100° C. to about 200° C. The esterification reaction is continued until the desired values for the hydroxyl number and acid number are obtained.

The polyester polyols utilized in the present invention generally have hydroxyl numbers in the range of from about 80 to about 250, and more often from about 100 to about 200, acid numbers below about 12, preferably from 1 to about 10, and an $\overline{Mn}$ of from about 800 to about 6000, more often from about 800 to about 3000. The polyester polyols generally are highly viscous, colorless clear resins which are soluble in solvents such as toluene, ethyl acetate, butyl acetate, methyl glycol acetate, ethyl glycol acetate, methyl ethyl ketone, methyl isobutyl ketone, etc.

The following examples illustrate the preparation of polyester polyols useful in the present invention. Unless otherwise indicated in the following examples and elsewhere in the specification and claims, all parts and percentages are by weight, temperatures are in degrees centigrade, and pressures are at or near atmospheric pressure.

EXAMPLE 1

A mixture of 560 grams (4.75 moles) of 1,6-hexanediol, 184 grams (2 moles) of glycerol, 481.4 grams (2.9 moles) of isophthalic acid, 320 grams (1.7 moles) of azelaic acid, and 191 grams (1.15 moles) of terephthalic acid is prepared in a reactor and heated to a temperature of from 100° C. to 150° C. After one or two hours, the temperature is gradually raised to 200° C. over a period of 4 to 8 hours while water is removed by distillation. During this period, the mixture becomes homogeneous and clear. A catalytic quantity of titanium tetrabutylate is then added, and esterification is continued at 200° C. under reduced pressure. The pressure is lowered to 10 to 20 mbar in the course of 6 to 8 hours, and stirring is continued under these conditions until the desired acid number (8) has been reached. The polyester polyol is recovered and is found to have a hydroxyl number of 149, an avenge functionality of about 4 and an avenge molecular weight of about 1530. The polyester contains 54 mole percent of the polyol components, and 46 mole percent of the dicarboxylic acid component.

EXAMPLE 2

The procedure of Example 1 is repeated except that the mixture charged to the reactor contains 380.6 grams (3.2 moles) of 1,6-hexanediol, 54.4 grams (0.4 mole) of pentaerythritol, 348.6 grams (2.1 moles) of isophthalic acid, and 106.2 grams (0.53 mole) of sebacic acid. The polyester polyol prepared in this manner is found to have a hydroxyl number of 187, an acid number of 5, an average functionality of about 2.8 and an avenge molecular weight of about 800. This polyester contains 58 mole percent of the polyol component and 42 mole percent of the dicarboxylic acid component.

The polyester polyols useful in forming the aliphatic polyurethanes utilized in the present invention are described in, for example, U.S. Pat. No. 4,656,243 (Pedain et al), and the disclosure of this patent relating to polyester polyols and methods of preparing polyester polyols is hereby incorporated by reference. Useful polyester polyols also are commercially available. Desmophen 670A-80 is available as a solution in n-butyl acetate (80% solids) from the Miles Industrial Chemical Division of Miles Inc., Pittsburgh, Pa. This polyester polyol is believed to be derived from a mixture comprising isophthalic acid, 1,6-hexanediol, trimethyolpropane and phthalic acid or phthalic acid anhydride and is characterized as having an equivalent weight of about 500, an acid number of 2.0 maximum and a hydroxyl number of about 104 to about 112. Other polyester polyols are available from Miles under the general trade designation Desmophen and Multron.

Aliphatic polyurethanes can be prepared from the aliphatic polyisocyanates and polyester polyols described above by techniques described in the art. Generally, the preparation of the polyurethanes involves reaction of the polyester polyol and the aliphatic polyisocyanate, preferably using an excess of the polyisocyanate. An extensive description of some of these techniques for preparing polyurethanes can be found in J. H. Saunders and K. C. Frisch, *Polyurethanes: Chemistry and Technology Part II*, Interscience (New York, 1964), especially on pages 8–49 and in the various references cited therein. The preparation and properties of polyurethanes also are described by E. N. Doyle in *The Development and Use of Polyurethane Products*, McGraw-Hill, 1971.

Particularly preferred aliphatic diisocyanates for preparing polyurethanes which have optimal low temperature flexibility, exterior durability and reduced tendency to yellow include 4,4'-methylene-dicyclohexyldiisocyanate, cyclohexane-1,4-diisocyanate, hexamethylene-1,6-diisocyanate, isophorone diisocyanate, tetramethylene-1,4-diisocyanate, etc. In one particular embodiment, the biuret of hexamethylene-1,6-diisocyanate is utilized which is available commercially from Miles under the designation Desmodur N-100 (85% solids) and Desmodur N-3200 (100% solids).

The equivalent ratio of polyisocyanate to polyol may vary between the slight excess of the polyisocyanate to a large excess of the polyisocyanate. Thus equivalent ratios of from about 1.01:1.00 NCO/OH up about 4:1 may be used. Generally, the equivalent ratio ranges from about 1.05:1 to 1.5:1, and the ratio is preferably from about 1.05:1 to 1.30:1.

A catalyst is generally included to promote the reaction between the polyisocyanate and the polyester polyol. A variety of catalysts are described by Doyle in *The Development and Use of Polyurethane Products*, supra, and preferred catalysts are those such as tin, zinc, manganese, cobalt and zirconium compounds. Tertiary mines may also be used. Metal catalysts of tin and zinc are particularly preferred, and dibutyl tin dilaurate and dibutyl tin sulfide are particularly preferred. The catalyst generally may be present in amounts of about 0.001% to about 1% by weight based on the solids content of the formulations.

Polymerization mixtures generally will contain one or more solvents which are inert to the reaction mixture. The solvent should be sufficiently low boiling so that it will vaporize when coated onto a surface in a thin film. Preferred solvents include low boiling esters such as ethyl acetate, butyl acetate, amyl acetate, 2-ethoxyethyl acetate, 2-(2-ethoxy)ethoxyethylacetate, 2-butoxyethyl acetate and other similar esters, hydrocarbons such as toluene and xylene, ketones, chlorinated solvents, nitro aliphatic solvents, dioxane, etc. The amount of solvent in the polymerization mixture may be varied over a wide range such as from about 3% to about 50% by weight.

Thus, the film-forming urethane mixture also may contain, and generally does contain at least one non-reactive solvent such as toluene, ethyl acetate, butyl acetate, etc. The amount of solvent present in the film-forming mixture may vary over a wide range, but the amount of solvent generally will be in the range of from 0% to about 40% by weight and more often from about 20% to about 35% by weight.

Inhibitors, antioxidants and ultraviolet absorbers or light stabilizers also may be included in the urethane coating formulations provided they do not add color to the formulations. Particularly useful ultraviolet absorbers, inhibitors and antioxidants include benzotriazole derivatives, hydroxy benzophenones, esters of benzoic acids, oxalic acid, diamides, etc. Various benzotriazole derivatives useful as ultraviolet absorbers and stabilizers are described in U.S. Pat. Nos. 3,004,896; 4,315,848; 4,511,596; and 4,524,165. Those portions of these patents which describe the various benzotriazole derivatives are incorporated herein by reference. Useful ultraviolet light stabilizers, inhibitors and antioxidants are available from Ciba-Geigy Corporation under the general trade designation "Tinuvin." For example, Tinuvin 328 is described as an ultraviolet absorber which is identified as 2-(2'-hydroxy-3',5'-di-tert-amylphenyl)benzotriazole, and Tinuvin 292 is a hindered amine light stabilizer identified as bis(1,2,2,6,6-pentamethyl-4-piperidinyl)sebacate.

Surfactants often are included in the polyurethane formulations, and a variety of surfactants have been found to be useful. For example, surfactants utilized in the urethane formulations used in the present invention may include hydroxy-functional silicone-based surfactants, non-hydroxy functional silicone-based surfactants, hydroxy-functional non-silicone-based surfactants, and non-hydroxy functional non-silicone based surfactants. Various amounts of one or more surfactants may be included, and generally, the mixture used to form the aliphatic polyurethane topcoat of the present invention will contain from about 0.0005 to about 5% by weight of the surfactant.

The hydroxy-functional silicone-based surfactant are exemplified by a group of surfactant which are silicone glycol copolymers, and more particularly, trimethyl silicone glycol copolymers such as those available from Dow Corning under the designation Dow Corning 190 and Dow Corning 193.

Examples of non-hydroxy-functional silicone-based surfactants which can be utilized in preparing the aliphatic polyurethane topcoats of the present invention include, for example, silicone polyethers which are available from Dow Corning Corporation and from BYK-Chemie USA. Suffactant Q2-5309 is available from Dow Corning and is identified as 2-(3-hydroxypropyl)-heptamethyl trisiloxane, ethoxylated acetate. A number of polyether modified silicones are available from BYK-Chemie under designations such as BYK-300, BYK-306, BYK-307, BYK-341, BYK-344, etc. These surfactants are polyether modified dimethylpolysiloxanes containing ethoxy or substituted ethoxy groups, but no hydroxyl groups.

The surfactant which may be included in the film-forming mixture may be a hydroxy-containing non-silicone surfactant. A particularly useful type of hydroxy-containing non-silicone surfactant comprises the hydroxyalkyl imidazoline surfactants such as represented by the following formula

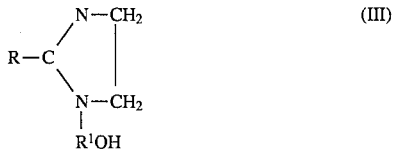  (III)

wherein R is an aliphatic group containing from about 10 to about 22 carbon atoms and $R^1$ is an alkylene group containing from 1 to about 3 carbon atoms. Generally, R is a fatty alkyl group derived from fatty acids such as oleic acid, stearic acid, lauric acid, tall oil, coconut oil, etc. A series of useful hydroxyalkyl imidazolines are available from Calgene Chemical Inc. under the general designation Hodag C-100 series. In the C-100 series, $R^1$ in the above formula is an ethylene group and R represents an oleic group (C-100-O) or a stearic group (C-100-S) or a lauric group (C-100-L) or a tallate group (C-100-T). Hydroxy-containing imidazolines of Formula III also are available from Rhone Poulenc under the general trade designation Miramine®. For example, Miramine C is identified as coconut hydroxyethyl imidazoline; Miramine O is oleyl hydroxyethyl imidazoline, and Miramine TO is tall oil hydroxyethyl imidazoline. These imidazoline derivatives have been found to be particularly effective as surfactants even when present in small amounts such as 0.01% by weight on a dry basis in the mixtures used to form the aliphatic polyurethane topcoat in accordance with the present invention.

The film-forming mixture used to form the aliphatic urethane topcoat also contains (B) cellulose acetate butyrate. The cellulose acetate butyrate is incorporated into the mixture to control the rheology of the polymer, and the aliphatic polyurethane topcoat which is obtained with the urethane mixtures containing cellulose acetate butyrate are further characterized as smooth, level and essentially free of holes. The amount of cellulose acetate butyrate contained in the mixture used to form the polyurethane topcoat may vary over a wide range but is generally within the range of from about 0.01% to about 5% by weight.

The butyryl group content of the cellulose acetate butyrates which are particularly useful in the present invention may range from about 30% by weight up to about 60% by weight. In one preferred embodiment, the cellulose acetate butyrate used in the invention contains from about 40% to about 55% by weight of butyryl groups. Cellulose acetate butyrate CAB-381 available from Eastman Chemical Company has a butyryl content of from about 38% and an acetyl content of about 13.5%, and CAB-551-0.2 has an average butyryl content of about 52 weight percent (minimum 49 weight percent), and an acetyl content of about 2% (maximum 4 weight percent).

The appropriate physical properties of the aliphatic urethane films useful as the topcoats of the invention are shown in Table I.

TABLE I

|  | General Range | Preferred Range |
|---|---|---|
| Elongation: | 70–160% | 100–130% |
| Yield Tensile: | 0–3 lb/in. | 0–1 lb/in. |
| Break Tensile: | 1–7.0 lb/in. | 2–5 lb/in. |

The film-forming urethane mixtures of the invention may contain other conventional additives such as color stabilizers, pigments, extenders, plasticizers, fillers, etc. Although fillers such as silica can be included in the mixtures and in the topcoats, the topcoat generally is free of silica and other inorganic particulate fillers.

The following examples 3–7 illustrate mixtures useful for forming the aliphatic polyurethane topcoats in accordance with the present invention. The NCO/OH ratio in Examples 3–6 is 1.05, and the ratio in Example 7 is 1.2.

|  |  | Examples 3–7 | | | | |
| --- | --- | --- | --- | --- | --- | --- |
|  |  | Ex. 3 | Ex. 3 | Ex. 4 | Ex. 5 | Ex. 6 | Ex. 7 |
| Components | Wt. % Solids | Wet Wt. % | Dry Wt. % | Dry Wt. % | Dry Wt. % | Dry Wt. % | Wet Wt. % |
| Desmophen 670A-80 | 80 | 61.2 | 68.0 | 67.2 | 66.7 | 66.8 | 65.4 |
| Desmodur N-100 | 85 | 23.3 | 27.5 | 27.4 | — | — | 30.3 |
| N-3200 | 100 | — | — | — | 25.5 | 25.7 | — |
| Butyl Acetate | 0 | 9.2 | 0 | 0 | 0 | 0 | — |
| Cellulose Acetate Butyrate |  |  |  |  |  |  |  |
| CAB 551 | 20 | 3.6 | 1.0 | 2.0 | — | — | 1.0 |
| CAB 381 | 15 | — | — | — | 2.2 | 3.5 | — |
| Hodag C-100 T | 10 | 0.08 | 0.01 | — | — | — | 0.01 |
| BYK 307 | 100 | — | — | — | — | 1.0 | — |
| BYK 306 | 12.5 | — | — | — | 2.5 | — | — |
| Dibutyl tin sulfide | 10 | 0.033 | 0.005 | 0.003 | 0.01 | 0.01 | 0.005 |
| 2,4-pentanedione (inhibitor) | 0 | 0.13 | 0 | 0 | 0 | 0 | 0.13 |
| Tinuvin 292 | 100 | 1.4 | 1.9 | 1.9 | 1.7 | 1.7 | 1.8 |
| Tinuvin 327 | 100 | 1.1 | 1.5 | 1.5 | 1.4 | 1.3 | 1.5 |

The aliphatic polyurethane topcoat forming mixtures (formulations) described above can be used in all types of retroreflective sheeting to provide a desirable transparent topcoat having improved weatherability, embossability, reflectivity, printability, etc. In one preferred embodiment, the aliphatic polyurethane topcoats are used in the preparation of embedded lens retroreflective sheeting which may include any of the various types of embedded lens reflective sheeting known in the art.

In one particular embodiment of the invention, the embedded lens retroreflective sheeting of the invention comprises (A) a monolayer of transparent microsphere lenses;

(B) a polymeric spacing layer underlying and contacting the bottom surfaces of the lenses and having a back surface that is spaced from the bottom surfaces of the lenses;

(C) a reflective layer having its top surface in contact with the back surface of the spacing layer; and (D) an aliphatic polyurethane topcoat overlying and conforming to the top surfaces of the lenses and having a flat top surface or face, said topcoat being obtainable from a film-forming mixture comprising (D-1) an aliphatic polyurethane derived from an aliphatic polyisocyanate and a polyester polyol prepared from a mixture of (D-1-a) a dicarboxylic acid component comprising isophthalic acid as the major dicarboxylic acid; and (D-1-b) a polyol component; and (D-2) cellulose acetate butyrate.

In addition, the embedded lens retroreflective sheeting may also comprise (E) a pressure-sensitive adhesive layer underlying and in contact with the reflective layer (C), and further optionally (F), a release liner underlying and in contact with the adhesive layer.

The coating weight of the polymeric spacing layer or spacecoat (B) may be from about 15 to 40 gms/m² and more often is from 20–25 gms/m². The coating thickness may range from about 0.5 to 1.5 mils. The coating weight of the polyurethane topcoat (D) may range from about 25 to 175 gms/m². Preferably the coating weight is about 50 to 150 gms/m² and more preferably is from about 60 to 120 gms/m². The topcoat thickness may range from 1 to about 5 mils and more often is from about 2–5 mils. When present, the thickness of the pressure-sensitive adhesion layer (E) will range from 0.2 to 5 mils and more often is from about 0.5 to 1.5 mils.

Figure 2:
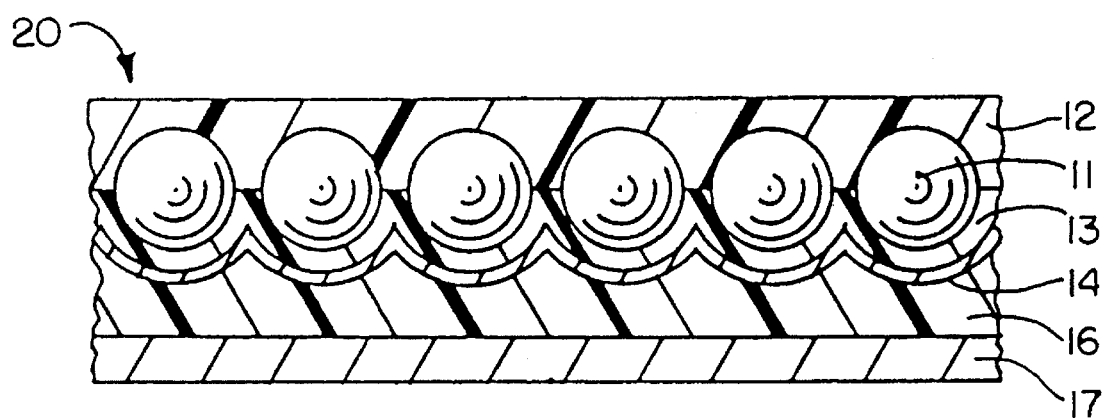
FIG. 2 is an enlarged schematic cross-section through another enclosed lens retroreflective sheeting of the invention.

Two embodiments of the retroreflective sheeting of the present invention are illustrated in FIGS. 1 and 2 wherein like numbers are used to refer to identical elements. Thus, retroreflective sheeting 10 shown in FIG. 1 and the retroreflective sheeting 20 shown in FIG. 2 comprise a monolayer of glass microspheres 11 partially embedded in a transparent polymeric topcoat layer 12, and in a spacing layer 13 underlying the back surfaces of the microspheres 11. A reflective layer 14 (e.g., vapor deposited aluminum) is in contact with the back surface of the spacing layer 13. In FIG. 2, a pressure-sensitive adhesive layer 16 underlies and is in contact with the reflective layer 14, and a release liner 17 is in contact with the bottom surface of the pressure-sensitive adhesive layer 16.

Various thermoplastic polymeric resins have been used previously in forming the spacing layer of embedded lens retroreflective sheeting, and such resins can be used in the sheetings of the present invention. The resins that may be used for the spacing layer include a variety of partially amorphous or semi-crystalline thermoplastic polymers which generally have a soft stage during which the lenses can be embedded in the films. The material used to form the spacing film or layer should be compatible with the topcoat material and adapted to form a good bond with the topcoat (and the microsphere lenses). Preferably, the adhesion between the materials is greater than the tensile strength of the materials. Acrylics, polyvinyl butyrals, aliphatic urethanes and polyesters are particularly useful polymer materials because of their outdoor stability. Copolymers of ethylene and an acrylic acid or methacrylic and polyacrylates are other examples of polymers that can be used for the cover and spacing layers of the sheeting of the invention. In one embodiment it is desirable to use materials having elastomeric properties to provide retroreflective sheeting which may be repeatedly stretched or flexed, and upon release of the stretching or flexing tension, rapidly return to substantially their original dimensions without significant loss of retroreflectivity. Certain polyolefins such as polyethylenes are available which possess such elastomeric propers and these materials can be used as space coat materials.

The transparent microsphere lenses utilized in a retroreflective sheeting of the present invention may be characterized as having average diameters in a range of from about 30 to about 120 microns, and more often in a range from about 40 to about 100 microns. The index of refraction of the microsphere lenses is generally in the range of from about 2.0 to about 2.5, and more typically is in the range of from about 2.1 to about 2.2. Glass microspheres are typically used although ceramic microspheres such as those made by sol/gel techniques can also be used. The index of refraction and the average diameter of the microspheres, and the index of refraction of the urethane topcoat and space coat dictate the thickness of the spacing film. The microspheres can be subjected to chemical or physical treatments to improve the bond of the microspheres to the polymeric films. For example, the microspheres can be treated with a fluorocarbon or an adhesion promoting agent such as an aminosilane to improve the bond, or the spacecoat layer in which the lenses have been embedded can be subjected to a flame treatment or corona discharge to improve the bond between the spacecoat and lenses to the subsequently applied topcoat.

As exemplified in FIG. 2, various other layers can be included in the sheeting of the invention in addition to those discussed above. For example, an adhesive layer can be applied over the reflective layer to protect the reflective layer and to serve a functional purpose such as adhering the sheeting to a substrate. Conventional pressure-sensitive adhesives such as acrylic-based adhesives, or heat- or solvent-activated adhesives are typically used and may be applied by conventional procedures. For example, a preformed layer of adhesive on a carrier web or release liner can be laminated to the reflective layer. Conventional release liners can be utilized in the formation of the retroreflective sheeting of the present invention.

The retroreflective sheeting of the present invention can be made by procedures normally used in the industry. For example, the sheeting of the invention can be prepared by first extruding or casting a space coat layer of desired thickness on a polymer coated casting sheet. The base coat layer is partially cured to provide a tacky surface upon which microspheres are cascade-coated to form a monolayer of the microspheres. The microspheres generally are embedded into the layer to a depth of about one-half of the average diameter of the microspheres. The aliphatic polyurethane topcoat film is then applied over the exposed microspheres by coating the exposed microspheres with one of the aliphatic polyurethane mixtures described above, such as in examples 3–7, over the top of the exposed and partially embedded microspheres. The urethane mixture and the base coat layer are then subjected to an elevated temperature to cure the urethane mixture and to complete the curing of the space coat layer.

The polymer coated casting sheet then is stripped from the space coat layer, and a reflective layer is subsequently applied over the back surface of the space coat. For example, a reflective layer of silver or aluminum metal can be applied by vapor deposition over the back surface of the space coat. The thickness of the reflective layer depends on the particular metal used and is generally between about 20 and 125 nanometers.

In another embodiment illustrated in FIG. 2, the retroreflective sheeting described in a previous paragraph is provided with a pressure-sensitive adhesive construction. In this embodiment, a pressure-sensitive adhesive is coated onto a release coated liner (paper or polymer) thereafter the adhesive coated liner is pressure laminated to the exposed surface of the reflective layer. This embodiment is illustrated in FIG. 2. The release coated liner can subsequently be removed and the retroreflective sheeting can be adhesively applied to other surfaces.

The following examples illustrate the preparation of enclosed lens retroreflective sheeting in accordance with the present invention.

Example A

A sheeting as illustrated in FIG. 1 is manufactured by first casting a space coat layer at a coat weight of approximately 21 g/m$^2$ on a polymer coated casting sheet and curing for about 5 minutes at a temperature of about 235° F. (112° C.). The space coat layer is a 22% solid solution comprised of polyvinyl butyral resin dispersed in a solvent. While the space coat layer remains in an uncured, tacky state, glass microspheres are cascade-coated onto the tacky film to form a monolayer of microspheres, and the microspheres are embedded to about 50% of their diameter by applying pressure. The glass microspheres have a mean diameter of about 50 microns with a refractive index of about 2.10 to 2.14. The urethane solution of Example 3, having been prepared prior to the coating run, is coated over the top of the exposed and partially embedded glass microspheres and cured for approximately 5 minutes at temperatures ranging from about 160° F. to 250° F.

In a separate operation, the polymer coated casting sheet is stripped from the sheeting, and the final layer, a reflective layer of aluminum metal, is subsequently applied by vapor deposition over the back surface of the space coat. The deposited layer of aluminum metal is very thin and estimated to be approximately 100 nm. For production monitoring purposes, it is more efficient to measure the quantity of metal deposited by electrical measurement. A resistance reading in the range of about 0.7 to 1.2 ohms/in$^2$ is considered acceptable. After the aluminum metal has been applied, the retroreflective sheeting is identical to the sheeting described in FIG. 1.

Example B

To form a pressure sensitive adhesive construction, a pressure sensitive adhesive is coated onto a release coated liner and pressure laminated to the reflective aluminum layer of the sheeting described in Example A. Typically, the pressure sensitive adhesive is a solvent acrylic adhesive of about 1 mil in thickness. Though other release coatings are available, silicone based polymers are the preferred release coating by the pressure sensitive adhesive industry. A cross-section of the resultant product is shown in FIG. 2.

The aliphatic urethane topcoat deposited on the sheeting in the above examples is transparent, printable, deformable and embossable. The retroreflective sheeting of the present invention containing the urethane topcoat is generally useful for imparting retroreflectivity in various applications such as license plates, traffic signs, pavement markings, construction zone markings, etc. More particularly, the retroreflective sheeting of the present invention having a printed display on the surface can be utilized in applications such as highway signs, including contoured signs, commercial signs, fleet markings and fleet graphics, building graphics, temporary and permanent traffic control devices signs, and printed decals. Non-printed surface applications of the retroreflective sheetings of the present invention include vehicle markings, computer cut graphics, die cut graphics, pin-stripping for vehicles, boats etc., decorating applications on various articles such as notebooks, book bags, backpacks, boats, cars, etc., pet collars, toy labels, fire hydrant markings, mud flaps, fish lures, baby strollers, helmet markings, etc.

A higher degree of sheeting flexibility is required for many of the applications stated above. For instance, reflective sheeting used for license plate applications must be flexible enough to withstand a hydraulic activated embossing procedure to impart raised alphanumeric characters, as well as a rimmed edge, to the license plate. A commercial hydraulic press which can be used for such embossing is the Embossing Press 500KN available from Erich Utsch KG Company of Germany. The raised letters and rimmed edge are subsequently printed with an ink system applied for enhanced visibility. Current urethane based topcoat formulations do not have sufficient elongation and, therefore, tend to crack at the edges of the embossed alphanumerics of the license plate. Using a urethane top layer of the invention in a reflective sheeting can increase the material elongation from approximately 10% to an approximate range of 60% to 120%. Testing has confirmed that a minimum elongation of approximately 50% to 60% is required for acceptable embossing performance.

Moreover, using the aliphatic urethanes described herein as the top layer for a reflective sheeting product can impart desirable print characteristics. Even though urethanes are generally known as difficult surfaces for printing, the combination of additives and urethane chemical formulation described herein provide a more print receptive surface compared to conventional urethane formulations. By comparison, printing of conventional urethane formulations requires inks specifically designed for urethane surfaces that cure slowly. Ambient cure durations of 3 to 14 days are common, with typical oven cure conditions of 150°–250° F. for 2 to 10 hours.

One preferred print method of the invention is a hot stamp foil ink transfer method. A common design of hot stamp foil printing apparatus license plate application is represented by the HOT STAMPING MACHINE ERUT R230, also sold by the Erich Utseh KG Company of Germany. In the process, the hot stamp foil is heated to approximately 200° C. and applied to the embossed surface of the license plate at a nip point. To ensure a well defined print edge on the embossed surfaces, the nip point is set at a minimal pressure to allow contact of the ink transfer tape to only the raised, embossed surfaces of the license plate. When conventional urethane formulations are used, the ink does not completely transfer to the surface of the sheeting, resulting in poor and unacceptable print aesthetics. Moreover, the ink anchorage of the ink that is transferred to the sheeting is insufficient for long-term performance.

The printing characteristics of the aliphatic urethane top layer can be improved by increasing the surface energy of the urethane topcoat which is characteristically in the range of from about 38 to about 44 dynes/cm. One method which has been found to be successful in increasing the surface energy to values generally in excess of 50 dynes/cm comprises laminating a thin film of polyester (about 3 mil) to the urethane topcoat after the urethane topcoat has been applied and cured and before the polymer coated casting sheet is removed from the construction and the refractive layer of aluminum is applied. The polyester film and/or lamination procedure results in the smoother surface for the urethane topcoat and, when the polyester film is removed, an increase in the surface energy to about 48 to about 52 dynes/cm. Utilizing this procedure, the print aesthetics and print anchorage are improved. This procedure for preparing enclosed lens retroreflective sheeting having improved surface energy and printability characteristics is illustrated in the following example.

Example C

The retroreflective sheeting is prepared by first casting a space coat layer at a coat weight of approximately 21 g/m² on a polymer coated casting sheet and curing for about 5 minutes at a temperature of about 235° F. (112° C.). The space coat layer is a 22% solid solution comprised of polyvinyl butyral resin dispersed in a solvent. While the space coat layer remains in an uncured, tacky state, glass microspheres are cascade-coated onto the tacky film to form a monolayer of microspheres, and the microspheres are embedded to about 50% of their diameter by applying pressure. The glass microspheres have a mean diameter of about 50 microns with a refractive index of about 2.10 to 2.14. The urethane solution of Example 3, having been prepared prior to the coating run, is coated over the top of the exposed and partially embedded glass microspheres and cured for approximately 5 minutes at temperatures ranging from about 160° F. to 250° F.

After the urethane coating has been cured, a 3 mil polyester film is laminated to the exposed surface of the urethane topcoat by passing the composite sheeting prepared above and the 3 mil polyester film through a nip point which applies a light pressure (generally less than 3 psig). Subsequently, the polymer coated casting sheet is stripped from the sheeting, and the final layer, a reflective layer of aluminum metal is applied by vapor deposition over the back surface of the space coat. The deposited layer of aluminum metal is very thin (about 10 nm). The polyester film previously laminated to the urethane surface is then removed leaving a smooth urethane surface having an acceptable surface energy.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. Retroreflective sheeting having an aliphatic polyurethane topcoat obtained from a film-forming mixture comprising
   (A) an aliphatic polyurethane derived from an aliphatic polyisocyanate and a polyester polyol prepared from a mixture comprising
      (A-1) a dicarboxylic acid component comprising isophthalic acid as the major dicarboxylic acid; and
      (A-2) a polyol component; and
   (B) cellulose acetate butyrate.

2. The sheeting of claim 1 wherein the dicarboxylic acid component (A-1) contains (i) from about 40 to about 80 mole percent of isophthalic acid, (ii) from about 20 to about 50 mole percent of at least one dicarboxylic acid of the formula

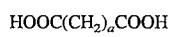

wherein n is an integer of from 2 to about 8, and (iii) from 0 to about 20 mole percent of at least one other dicarboxylic acid or dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

3. The sheeting of claim 1 wherein the polyol component (A-2) contains (iv) from about 70 to about 90 mole percent of 1,6-hexanediol and (v) from about 10 to about 30 mole percent of at least one higher hydric polyol.

4. The sheeting of claim 3 wherein the higher hydric polyol is selected from the group consisting of trimethylol propane, glycerol, pentaerythritol, and mixtures thereof.

5. The sheeting of claim 1 wherein the polyester polyol is prepared from a mixture comprising from about 40 to about 60 mole percent of the dicarboxylic acid component, and from about 40 to about 60 mole percent of the polyol component.

6. The sheeting of claim 1 wherein the polyester polyol is prepared from a mixture comprising from about 42 to about 55 mole percent of the dicarboxylic acid component, and from about 45 to about 58 mole percent of the polyol component.

7. The sheeting of claim 2 wherein the dicarboxylic acid (ii) is adipic acid and (iii) is phthalic acid and/or phthalic acid anhydride.

8. The sheeting of claim 1 wherein the cellulose acetate butyrate contains from about 30% to about 60% of butyryl groups.

9. The sheeting of claim 1 wherein the cellulose acetate butyrate contains from about 40% to about 55% by weight of butyryl groups.

10. The sheeting of claim 1 wherein the film-forming mixture also comprises (C) at least one non-reactive solvent.

11. The sheeting of claim 1 wherein the film-forming mixture also comprises (D) at least one surfactant.

12. The sheeting of claim 11 wherein the surfactant (D) is at least one hydroxy-containing non-silicone surfactant.

13. The sheeting of claim 12 wherein the surfactant (D) is a hydroxy alkyl imidazoline represented by the formula

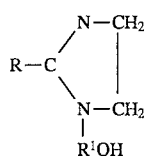

wherein R is an aliphatic group containing from about 10 to about 22 carbon atoms and $R^1$ is an alkylene group containing from 1 to about 3 carbon atoms.

14. The sheeting of claim 1 wherein the film-forming mixture contains from about 0.01% to about 5% by weight of cellulose acetate butyrate.

15. The sheeting of claim 1 wherein the film-forming mixture contains from about 70% to 98% by weight of the polyurethane (A).

16. The sheeting of claim 11 wherein the film-forming mixture contains from about 0.0005 to about 2.0% by weight of the surfactant (D).

17. The sheeting of claim 10 wherein the solvent in the mixture is selected from butyl acetate, toluene, and mixtures thereof.

18. The sheeting of claim 1 comprising an embedded lens retroreflective sheeting.

19. An embedded lens retroreflective sheeting comprising (A) a monolayer of transparent microsphere lenses;

(B) A polymeric spacing layer underlying and contacting the bottom surfaces of the lenses and having a back surface that is spaced from the bottom surfaces of the lenses;

(C) a reflective layer having its top surface in contact with the back surface of the spacing layer; and (D) an aliphatic polyurethane topcoat layer overlying and conforming the top surface of the lenses and having a flat top surface, said topcoat being obtained from a film-forming mixture comprising (D-1) an aliphatic polyurethane derived from an aliphatic polyisocyanate and a polyester polyol prepared from a mixture of (D-1-a) a dicarboxylic acid component comprising at least 40 mole percent of isophthalic acid; and (D-1-b) a polyol component; and (D-2) cellulose acetate butyrate.

20. The sheeting of claim 19 wherein the film-forming mixture of (D) also comprises (D-3) at least one non-reactive solvent other than (D-2).

21. The sheeting of claim 19 wherein the dicarboxylic acid component (D-1-A) contains (i) from about 40 to about 80 mole percent of isophthalic acid, (ii) from about 20 to about 50 mole percent of at least one dicarboxylic acid of the formula

HOOC(CH$_2$)$_n$COOH wherein N is an integer of from 2 to about 8, and (iii) from 0 to about 20 mole percent of at least one other dicarboxylic acid or dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

22. The sheeting of claim 19 wherein the polyol component (D-2-A) contains (iv) from about 70 to about 90 mole percent of hexane 1,6-diol, and (v) from about 10 to about 30 mole percent of at least one higher hydric polyol selected from the group consisting of trimethylol propane, glycerol, pentaerythritol, and mixtures thereof.

23. The sheeting of claim 19 wherein the polyester polyol is prepared from a mixture comprising from about 42 to about 55 mole percent of the dicarboxylic acid component, and from about 45 to about 58 mole percent of the polyol component.

24. The sheeting of claim 19 wherein the dicarboxylic acid (ii) is adipic acid and (iii) is phthalic acid and/or phthalic acid anhydride.

25. The sheeting of claim 19 wherein the cellulose acetate butyrate present in the film-forming mixture of (D) contains from about 30% to about 60% of butyryl groups.

26. The sheeting of claim 19 wherein the cellulose acetate butyrate (D-2) present in the film-forming mixture of (D) contains from about 49% to about 55% of butyryl groups.

27. The sheeting of claim 19 wherein the film-forming mixture (D) also contains (D-4) at least one hydroxy-containing non-silicone surfactant.

28. The sheeting of claim 27 wherein the surfactant is a hydroxy alkyl imidazoline represented by the formula

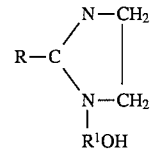

wherein R is an aliphatic group containing from about 10 to about 22 carbon atoms and $R^1$ is an alkylene group containing from 1 to about 3 carbon atoms.

29. The sheeting of claim 20 wherein the solvent (D-3) is selected from the group consisting of butyl acetate, toluene, and mixtures thereof.

30. The sheeting of claim 19 wherein the topcoat is derived from a film-forming mixture comprising from about 70% to about 98% by weight of the aliphatic polyurethane (D-1) and from about 0.5% to about 5% by weight of cellulose acetate butyrate (D-2).

31. The sheeting of claim 30 wherein the film-forming mixture also contains from about 0.0005% to about 1% by weight of a hydroxy-containing non-silicone surfactant.

32. The sheeting of claim 19 also comprising (E) a pressure-sensitive adhesive layer underlying the reflective layer (C), and, optionally, (F) a release layer underlying and in contact with the adhesive layer.

* * * * *